United States Patent [19]

Matsuda et al.

[11] Patent Number: 4,629,882

[45] Date of Patent: Dec. 16, 1986

[54] IMAGE POSITION DETECTOR

[75] Inventors: Motonobu Matsuda, Kawachinagano; Toru Matsui, Osaka, both of Japan

[73] Assignee: Minolta Camera Kabushiki Kaisha, Osaka, Japan

[21] Appl. No.: 689,579

[22] Filed: Jan. 7, 1985

Related U.S. Application Data

[63] Continuation of Ser. No. 362,033, Mar. 25, 1982, abandoned.

[30] Foreign Application Priority Data

Mar. 26, 1981 [JP] Japan ................................. 56-44818

[51] Int. Cl.$^4$ ............................................. H01J 40/14
[52] U.S. Cl. ................................. 250/211 J; 250/201
[58] Field of Search ............... 250/211 J, 211 K, 201, 250/203; 354/403; 356/1, 4; 357/29, 30

[56] References Cited

U.S. PATENT DOCUMENTS

| | | |
|---|---|---|
| 2,641,712 | 6/1953 | Kircher ................................ 250/203 |
| 3,028,500 | 4/1962 | Wallmark ........................... 250/211 J |
| 3,369,124 | 1/1968 | Dueker ................................ 250/211 |
| 3,435,232 | 3/1969 | Sorensen ............................ 250/203 |
| 3,619,621 | 11/1971 | Maret ................................. 250/211 J |
| 3,704,376 | 11/1972 | Lehovec . | |
| 3,723,003 | 3/1973 | Vockenhuber et al. ................. 356/4 |
| 3,742,223 | 6/1973 | Carr et al. . | |
| 3,870,887 | 3/1975 | Dueker et al. . | |
| 3,904,871 | 9/1975 | Dueker et al. . | |
| 4,251,144 | 2/1981 | Matsuda et al. ...................... 354/25 |
| 4,264,161 | 4/1981 | Husue et al. ......................... 250/203 |
| 4,288,152 | 9/1981 | Matsuda . | |
| 4,309,604 | 1/1982 | Yoshikawa et al. ............. 250/211 J |
| 4,441,810 | 4/1984 | Momose et al. ........................ 356/1 |

FOREIGN PATENT DOCUMENTS 50-29330  9/1975  Japan .

OTHER PUBLICATIONS

National Technical Report—Dec., 1983—Photodetectors for Auto-Focus Systems.

Primary Examiner—David C. Nelms
Assistant Examiner—James G. Gatto
Attorney, Agent, or Firm—Price, Gess & Ubell

[57] ABSTRACT

An image position detector includes a light receiving element for receiving an image of an object and for producing an electric signal generated by the image, and a signal processing circuit for processing the electric signal and for producing a position signal representing a position of the image on the light receiving element. The light receiving element is defined by a semiconductor device having an n-type substrate and p-type region formed in the substrate. A current generated between the n-type substrate and p-type region is in relation to the distance to the image from the p-type region. The signal processing circuit receives the generated current and determines the position of the image by the level of the generated current.

22 Claims, 16 Drawing Figures

IMAGE POSITION DETECTOR

This is a continuation of application Ser. No. 362,033, filed on Mar. 25, 1982, now abandoned.

BACKGROUND OF THE INVENTION

1. Field of the invention

The present invention relates to an image position detecting device and, more particularly, to a device which includes a light receiving element and a signal processing circuit for detecting the position of the image formed on the light receiving element.

2. Description of the Prior Art

There have been proposed various image position detecting devices and one of which is disclosed in U.S. Pat. No. 3,723,003 to Vockenhuber et al. issued Mar. 27, 1973 (corresponding to German Patent Offenlegungsschrift No. 1 956 014 laid open to public on Oct. 1, 1970). According to U.S. Pat. No. 3,723,003, the light receiving element is formed by an array of a plurality of light receiving units, such as photodiodes, and a circuit receives output from each of the light receiving units for detecting which one of the light receiving units is receiving the image. Since each light receiving unit must have a certain size, and since a number of light receiving units are provided to obtain a certain level of accuracy, the light receiving element comes relatively large in size.

An improved image position detecting device similar to that described above is disclosed in U.S. Pat. No. 4,251,144 to Matsuda et al. issued Feb. 17, 1981 (corresponding to German Patent Offenlegungsschrift No. 29 09 090 laid open to public on Sept. 20, 1979). According to U.S. Pat. No. 4,251,144, the circuit for detecting the position of the image permits the detection of an image which is formed on a single unit of an array of light receiving units, or on two or more units in a bridged manner so as to improve the accuracy of the detection. The circuit, however, is relatively complicated and requires a number of constructing parts.

Another type of image position detecting device is disclosed in Tokkosho (Japanese Patent Publication) No. 50-29330. According to Tokkosho No. 50-29330, the light receiving element is defined by a rectangular photoconductive plate, such as CdSe, having an electrode belt deposited on one long side of the plate and an ohmic resistance belt deposited on the opposite long side of the plate. Each of the belts has a terminal at the end of the belt for the external connection. An optical arrangement is provided in front of the light receiving element so as to form a line image which crosses on the element such that the line image extends from the electrode belt and crosses the photoconductive plate perpendicularly to the resistance belt. When the line image is sufficiently bright, a section on the photoconductive plate where the line image is impinged changes its resistance to approximately zero and if the remaining sections on the photoconductive plate are sufficiently dark, a current path is established over the line image between the electrode belt and the resistance belt, and accordingly, establishes a closed circuit between the terminals through a part of the electrode belt, the photoconductive plate along the line image and a part of resistance belt. The length of the resistance belt occupied in the closed circuit corresponds to the position of the line image, and thus, permits a detection of the position of the line image.

Although the image position detecting device according to Tokkosho No. 50-29330 has a simpler structure than the first mentioned device, it has the following disadvantages:

(a) The photoconductive plate has a poor sensitivity and its response speed is considerably long. Therefore, it can only detect a bright object moving relatively slow. In the case where the image position detecting device has a source of light for emitting light beams towards the object and receives the reflected light, such a light source must produce intense light beams that can form a bright image on the light receiving element. The employment of such a high power light source results in a bulky size of the device; and (b) Since the image is presented in a form of line, and since it must cross the electrode belt and resistance belt, it is necessary to adjust the location of line image in its lengthwise direction. In other words, if the line image fails to cross either the electrode belt or resistance belt, the image position detecting device will not provide a correct position of the image on the light receiving element.

SUMMARY OF THE INVENTION

The present invention has been developed with a for the purpose of substantially solving the above described disadvantages and has for its essential object to provide an improved image position detecting device having an improved light receiving element and an improved electric circuit connected to the light receiving element for detecting the position of the image formed on the unit.

It is also an essential object of the present invention to provide an image position detecting device of the above described type which can eliminate noise signals generated by the ambient light.

It is a further object of the present invention to provide an image position detecting device which is compact in size and can readily be manufactured at low cost.

In accomplishing these and other objects, an image position detecting device according to the present invention comprises a semiconductor device including a substrate adapted to receive the image thereon and made of either one of an n-type material and a p-type material, and a different type region defined in the substrate and made of the other of the n-type and p-type materials, whereby the different type region and the substrate produce therebetween a photocurrent which is a function of the position of the image on the substrate relative to the different type region with the brightness of the image kept unchanged.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which:

FIG. 1b is a cross-sectional view taken along a line Ib—Ib shown in FIG. 1a;

FIG. 2b is a cross-sectional view taken along a line IIb—IIb shown in FIG. 2a;

FIG. 3b is a cross-sectional view taken along a line IIIb—IIIb shown in FIG. 3a;

DESCRIPTION OF THE PREFERRED EMBODIMENTS

Figure 1A:
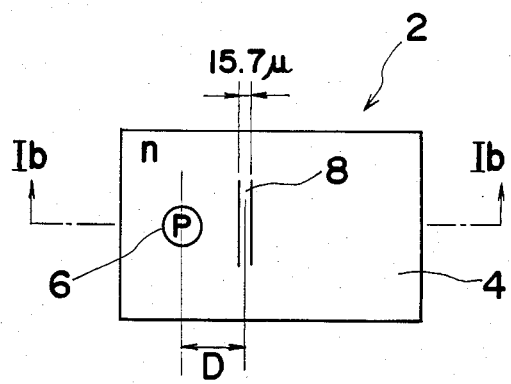
FIG. 1a is a diagrammatic view showing a fundamental structure of a light receiving element according to the present invention.
Figure 1C:
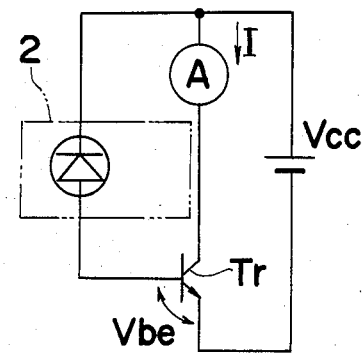
FIG. 1c is a circuit diagram showing an equivalent circuit of the light receiving element of FIG. 1a and a circuit associated for measuring current generated from the light receiving element.
Figure 1B:
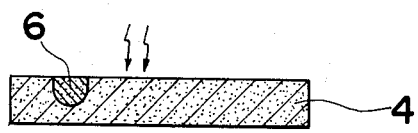

Referring particularly to FIGS. 1a and 1b, a fundamental structure of an light receiving element 2 employed in an image position detector according to the present invention is shown, and it comprises an n-type semiconductor plate 4 and a region 6 of p-type semiconductor formed within the semiconductor plate 4 by way of, e.g., impurity diffusion. When an image 8, for example a line image having a width of 15.7 micron, is formed on the image receiving unit 2 at a position spaced from the p-region 6 by a distance D, the light receiving element 2 functions as a photodiode to generate photocurrent I that flows between the semiconductor plate 4 and the region 6.

Figure 1D:
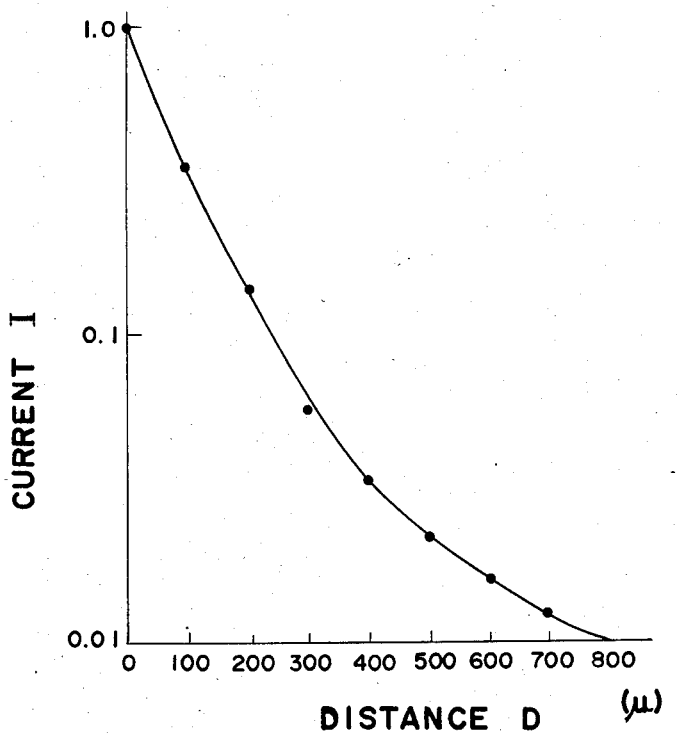
FIG. 1d is a graph showing a relation between the position of the image formed on the light receiving element and current generated therefrom.

An equivalent circuit of the light receiving element 2 is shown in FIG. 1c together with a current measuring circuit for measuring the amount of generated photocurrent I. The current measuring circuit is defined by a voltage source Vcc, a transistor Tr and a current meter A. As understood from the circuit of FIG. 1c, the photodiode (light receiving element) 2 is applied with reverse biased voltage Vcc-Vbe, in which Vbe is a voltage across the base emitter of the transistor Tr. According to the tests carried out by the present inventors, a curve as shown in FIG. 1d is obtained. In the graph of FIG. 1d, an abscissa represents distance D in microns and an ordinate represents normalized current on a logarithmically compressed scale. As apparent from the graph, the current I becomes smaller as the distance D becomes greater.

From the tests, the following facts are obtained:

(i) When the intensity of the impinging light is constant, the generated photocurrent I is relative to the distance D; and (ii) When the distance D is fixed, the generated photocurrent I is proportional to the light intensity.

By utilizing the fact (i), it is possible to obtain the distance D by measuring the generated current I, provided that the impinging light is constant. Furthermore, by utilizing the facts (i) and (ii), it is possible to obtain the distance D by measuring the generated current I and correcting the measured current by a measured light intensity.

In accomplishing the above, particularly the latter one, a further improved light receiving element 20 has been developed and is described below with reference to FIGS. 2a, 2b, 2c and 2d.

Figure 2A:
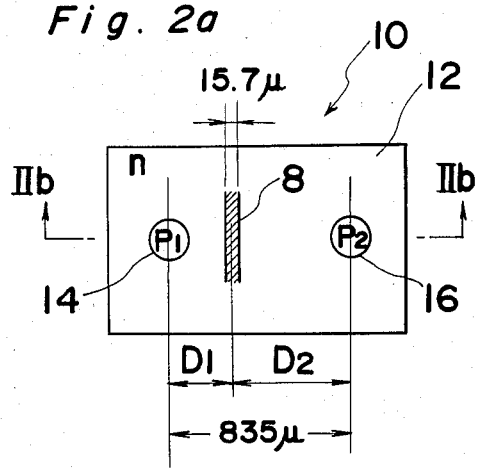
FIG. 2a is a diagrammatic view showing another fundamental structure of a light receiving element according to the present invention.
Figure 2C:
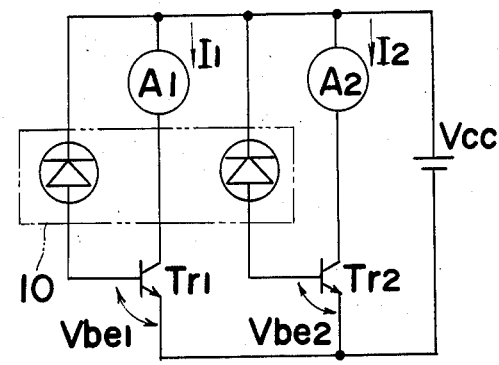
FIG. 2c is a circuit diagram showing an equivalent circuit of the light receiving element of FIG. 2a and a circuit associated for measuring currents generated from the light receiving element.
Figure 2B:
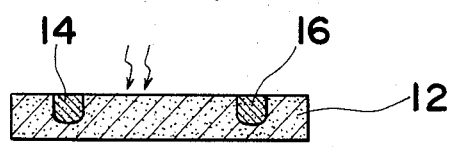

Referring particularly to FIGS. 2a and 2b, an improved light receiving element 10 has a structure similar to the above described light receiving element 2 but has two p-type regions 14 and 16 formed on the n-type semiconductor plate 12. The p-type regions 14 and 16 are spaced from each other by a predetermined distance, such as 835 microns. When the line image 8 having a width of 15.7 microns is formed between the p-type regions 14 and 16, the regions 14 and 16 together with the n-type semiconductor plate 12 function as two independent photodiodes to permit current flow between the semiconductor plate 12 and the region 14 and also between the semiconductor plate 12 and the region 16. As understood from the foregoing description, the current I1 flowing through the region 14 is in relation to a distance D1 between the line image 8 and the region 14, and the amount of current I2 flowing through the region 16 is in relation to a distance D2 between the line image 8 and the region 16.

Figure 2D:
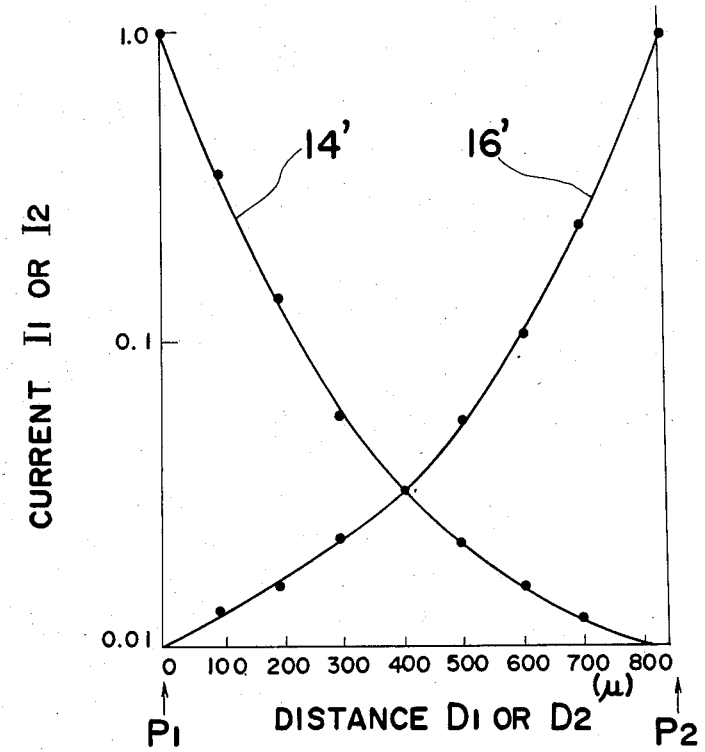
FIG. 2d is a graph showing a relation between the position of the image formed on the light receiving element of FIG. 2a and currents generated therefrom.

FIG. 2c shows an equivalent circuit of the light receiving element 10 and a current measuring circuit for measuring currents I1 and I2 flowing through the regions 14 and 16. The current measuring circuit shown is defined by two transistors Tr1 and Tr2, two current meters A1 and A2, and a voltage source Vcc. In FIG. 2c, Vbe1 and Vbe2 designate voltages across the base and emitter of the transistors Tr1 and Tr2, respectively. A relation between the current I1 and the distance D1 and also a relation between the current I2 and the distance D2 are shown in the graph of FIG. 2d in which an abscissa represents distance D1 or D2 and an ordinate represents normalized current I1 or I2 on a logarithmically compressed scale. In FIG. 2d, a curve 14' shows the current I1 obtained from the region 14, which is a curve similar to that shown in FIG. 1d, and curve 16' shows the current obtained from the region 16. Since the regions 14 and 16 are formed symmetrically about the center of the light receiving element 10, the curves 14' and 16'. are symmetric with each other about the center.

Although each of the currents I1 and I2 may vary with respect to any change of brightness of the line image 8, and also to any change of ambient light, such changes take place with the same degree for both currents I1 and I2. Accordingly, by taking a ratio between the currents I1 and I2, it is possible to obtain a parameter I1/I2 which is in relation to the distance D1 or D2 regardless of brightness of the line image 8 and the ambient light. In other words, by taking such a ratio, the above described changes can be eliminated, and therefore, the distance D1 or D2 can be obtained by using only the parameter I1/I2.

Next, preferred embodiments of the image position detecting device according to the present invention are described.

Figure 3A:
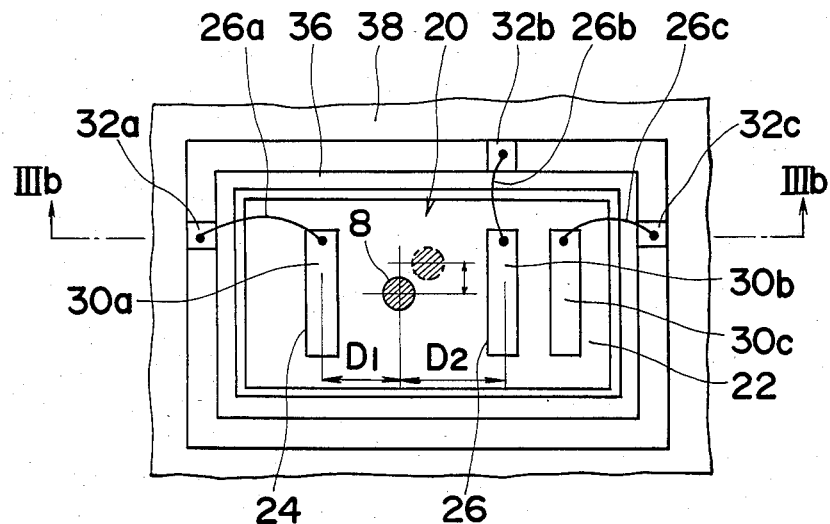
FIG. 3a is a top plan view of a light receiving element according to the present invention.
Figure 3B:
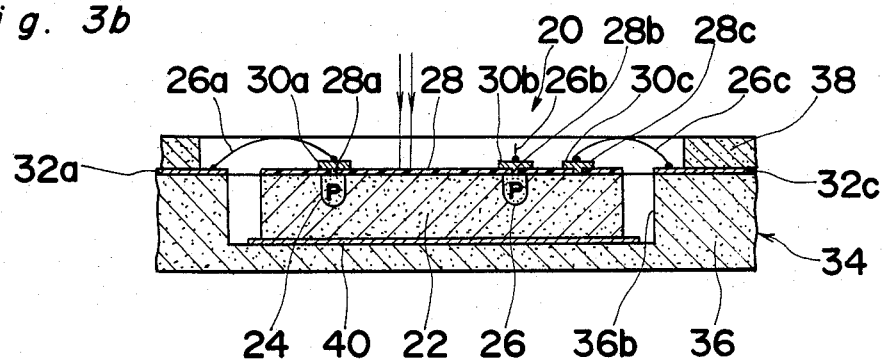

Referring particularly to FIGS. 3a and 3b, there is shown a light receiving element 20 according to the present invention. The light receiving element 20 comprises an n-type semiconductor plate 22 having a rectangular configuration. On a top surface of the n-type semiconductor plate 22, there are formed two elongated regions 24 and 26 of p-type semiconductor by way of, e.g., diffusion of an impurity substance, such as boron, gallium or indium. The two elongated regions 24 and 26 are spaced a predetermined distance from each other and are aligned parallelly with each other in a side-by-side relation. The top surface of the n-type semiconductor plate 22 is deposited with a transparent thin layer 28 (about 1 micron thick) of silicon oxide ($SiO_2$) which is electrically non-conductive. The layer 28 has narrow slits 28a, 28b and 28c formed respectively above the regions 24 and 26 and at a portion other than an area between the regions 24 and 26, such as at a portion adjacent the region 26 and remote from the region 24, as shown in FIG. 3b. Electrodes 30a, 30b and 30c are deposited on the silicon oxide layer 28 over the slits 28a, 28b and 28c, respectively, to electrically connect the electrodes 30a, 30b and 30c with p-type regions 24 and 26 and n-type plate 22, respectively.

It is to be noted that each of the electrodes 30a and 30b has a size sufficiently large to completely cover the respective regions 24 and 26 so as to prevent the p-type regions 24 and 26 from being directly hit by the light beams, and thus preventing the generation of any unwanted currents by such light beams directly impinging on the regions 24 and 26. The electrodes 30a, 30b and 30c are connected respectively through suitable lead lines, such as bonding wires 26a, 26b and 26c, to terminals 32a, 32b and 32c provided in a ceramic substrate 34. The ceramic substrate 34 is defined by a base plate 36 having a recess 36a for receiving the light receiving element 20 and a top plate 38. The terminals 32a, 32b and 32c are tightly held between the base plate 36 and the top plate 38. An electrically conductive layer 40 is placed between the light receiving element 20 and the base plate 36. It is to be noted that the terminals 32a, 32b and 32c and the layer 40 are formed by metalized film made of, e.g., tungsten with a thickness of about 10 microns.

Figure 3C:
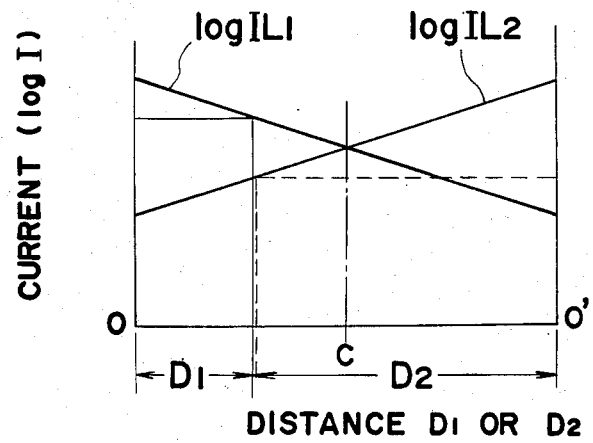
FIG. 3c is a graph showing a relation between the position of the image formed on the light receiving element of FIG. 3a and currents generated therefrom.

When an image 8 having, e.g., a circle configuration is formed on the light receiving element 24 between the electrodes 30a and 30b, a photocurrent IL1 is generated between p-region 24 and n-region 22, and accordingly, such a generated current IL1 flows between the electrodes 24e and 24g. At the same time, a photocurrent IL2 is generated between the p-region 26 and n-region 22, and it flows between the electrodes 24f and 24g. As understood from the foregoing description, the current IL1 is in relation to the distance D1 between the region 24 and the spot at which the image 8 is formed, and the current IL2 is in relation to the distance D2 between the region 26 and the spot of the image 8. The relations between current IL1 and the distance D1 and between current IL2 and the distance D2 is shown in a graph of FIG. 3c in which an abscissa represents distance D1 or D2 and an ordinate represents logarithmically compressed currents logIL1 or logIL2.

Figure 4:
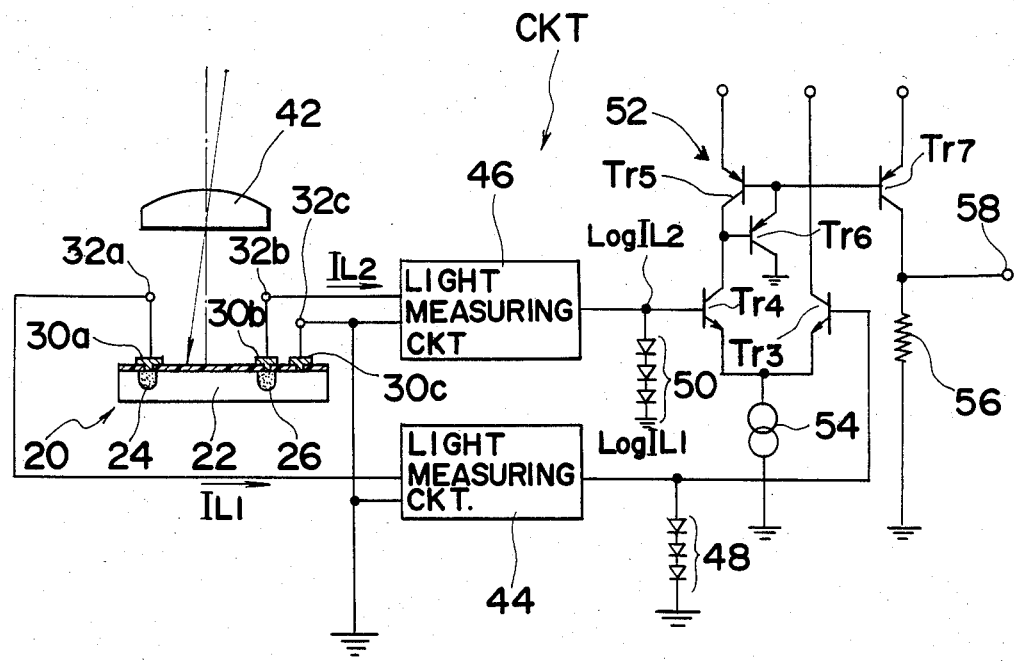
FIG. 4 is a circuit diagram of an image position detector according to one embodiment of the present invention.
Figure 5:
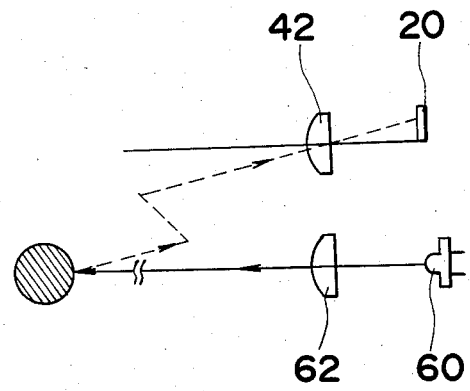
FIG. 5 is a diagram showing an optical arrangement which can be employed in the image position detector of FIG. 4.

Referring to FIG. 4, there is shown one embodiment of an image position detector employing the light receiving element 20 described above in connection with FIGS. 3a to 3c and a signal processing circuit CKT. The light receiving element 20 is provided in association with an optical arrangement which includes a converging lens 42 adapted to form an image of a target object on the light receiving element 20. The optical arrangement shown is of a type which receives light emitted from the subject. It can be, however, of a type which includes a light emission means and light receiving means, as shown in FIG. 5. The optical arrangement shown in FIG. 5 further includes a beam projection device defined by a light source, e.g., a light emitting diode 60, and a lens 62 for imposing a spot light on a target object. The lens 62 together with the light emitting diode 60 is located at a predetermined distance away from the converging lens 42 with their optical axes aligned approximately parallelly to each other. The reflected spot light is gathered by the converging lens 42 for forming an image of the spot light on the light receiving element 20.

The terminals 32a and 32b of the light receiving element 20, which are diagrammatically shown in FIG. 4, are connected to the signal processing circuit CKT, more particularly, to inputs of light measuring circuits 44 and 46, respectively, for eliminating the noise signal caused by the ambient light and for amplifying only the wanted signal. And the terminal 32c of the same is connected to the ground terminal of the light measuring circuits 44 and 46, and also to ground. The light measuring circuits 44 and 46 have the same structure as each other and are described in detail in U.S. Pat. No. 4,288,152 to Matsuda issued Sept. 8, 1981 (corresponding to German Patent Offenlegungsschrift No. D30 30 635 laid open to public on Mar. 26, 1981), particularly in connection with FIG. 4 thereof.

The output of the light measuring circuit 44 is connected to a logarithmic compression circuit 48 defined by a plurality of diodes connected in series. Thus, a voltage produced across the diodes 48 is in relation to the logarithmically compressed value of the current fed through such diodes. According to the embodiment shown, the diodes 48 receive a current IL1, and thus, a voltage logIL1 is present at the anode of the diodes 48.

Similarly, the output of the light measuring circuit 46 is connected to a logarithmic compression circuit 50 defined by the diodes connected in series, and thus, according to the embodiment shown, voltage logIL2 is present at the anode of the diodes 50.

The voltages logIL1 and logIL2 are applied to a differential amplifier 52 defined by transistors Tr3, Tr4, Tr5 and Tr6, and a constant current source 54. More particularly, the voltage logIL1 is applied to the base of the transistor Tr3 and the voltage log IL2 is applied to the base of the transistor Tr4. In the differential amplifier 52, the voltage logIL2 is subtracted from the voltage IL1, and a value relative to the difference (logIL1−logIL2) therebetween is produced from the emitter of the transistor Tr6. As apparent to those skilled in the art, such a difference (logIL1−logIL2) is equal to log(IL1/IL2), which is a logarithmic value of the ratio between currents IL1 and IL2. The difference (logIL1−IL2) is then applied to an amplifying transistor Tr7 and further to a resistor 56 for amplifying the difference (logIL1−logIL2) to a desired level and also for changing the impedance. Therefore, from an output terminal 58, the voltage relative to the value log(IL1/IL2) is produced, and this value indicates the position of the image formed on the light receiving element 20.

Since the light receiving element 20 is formed by a semiconductor, it is preferable to form the above described image position detector (excluding the lens assembly) by a single chip of semiconductor substrate as an IC device for reducing both the size and manufacturing cost of the image position detector. Particularly, a small size device is suitable for use in a camera.

Figure 6:
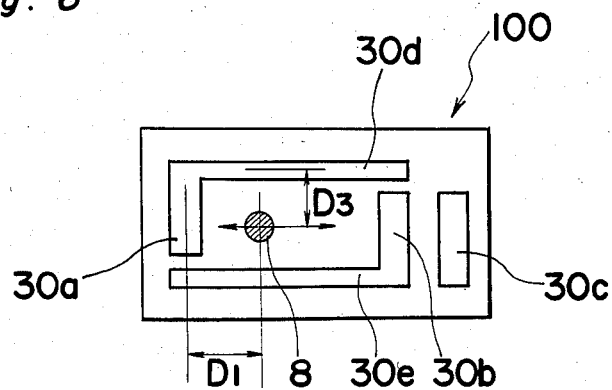
FIG. 6 is a diagrammatic view showing a modification of a light receiving element according to the present invention.

Referring to FIG. 6, there is shown a first modification of a light receiving element 100 which, when compared with the light receiving element 20, further includes electrodes 30$d$ and 30$e$ which are aligned parallelly and in opposing relation to each other, and in perpendicular relation to the electrodes 30$a$ and 30$b$, so that the image 8 can be formed between the electrodes 30$a$ and 30$b$ and also between the electrodes 30$d$ and 30$e$. Although in the modification shown in FIG. 6, the electrodes 30$a$ and 30$d$ are shown as formed integrally together, they can be formed separately so long as they are electrically connected with each other. The same can be said of the electrodes 30$b$ and 30$e$. It is to be noted that a belt of p-region is formed under each of the electrodes 30$d$ and 30$e$, in a similar manner as is formed under the electrodes 30$a$ and 30$b$. Therefore, when an image 8 is formed on the light receiving element 100, current flows through the electrode 30$d$ which is in relation to the distance between the image 8 and the electrode 30$d$ and, another current flows through the electrode 30$e$ which is in relation to the distance between the image 8 and the electrode 30$e$.

When an image 8 is formed on the light receiving element 100, a current is generated from the electrode 30$a$ and another current from the electrode 30$d$. As the image 8 shifts in a direction away from, or towards, the electrode 30$a$ but parallelly to the electrode 30$d$, the current from the electrode 30$a$ varies in a wide range, but the current from the electrode 30$d$ maintains constant. The degree of variation of the current from the electrode 30$a$ is still wide even after such a current is logarithmically compressed, as shown by a dotted line in FIG. 7. A chain line in FIG. 7 represents current from the electrode 30$d$ which is logarithmically compressed.

Figure 7:
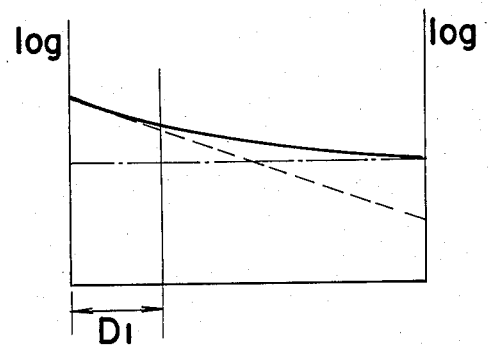
FIG. 7 is a graph showing a relation between current and position of the image on the light receiving element of FIG. 6.

However, when the current from the electrode 30$a$ is added with the current from the electrode 30$d$, and when the obtained sum is logarithmically compressed, the compressed current will change moderately, as shown by a real line in FIG. 7. This has an advantage when selecting a suitable operational amplifiers and other electric elements which have a certain range of operation.

The same can be said to the currents obtained from the electrodes 30$b$ and 30$e$.

Figure 8:
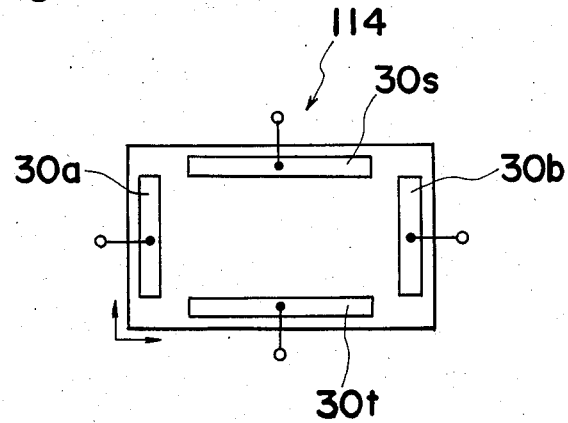
FIG. 8 is a diagrammatic view showing another modification of a light receiving element according to the present invention.

Referring to FIG. 8, there is shown another modification of the light receiving element 114 having electrodes 30$s$ and 30$t$ in addition to the electrodes 30$a$ and 30$b$. Unlike the above modification, each of the electrodes 30$s$ and 30$t$ is not electrically connected to any of the electrodes 30$a$ and 30$b$. The electrodes 30$s$ and 30$t$ are provided parallelly and in face-to-face relation to each other above and below an area defined between the electrodes 30$a$ and 30$b$. When the electrodes 30$s$ and 30$t$ are connected with the circuit similar to that shown in FIG. 4, it is possible to detect the position of the image in two dimensions in an analog manner.

It is to be noted that the modification described above in connection with FIG. 8 has a ground electrode but is omitted for the sake of brevity.

In the embodiment and modifications described above, it has been described that the plate 22 is made of n-type semiconductor material, and the material diffused in the plate 22 is p-type semiconductor. The relation, however, can be opposite, that is, the plate 22 can be made of p-type semiconductor and the diffused impurity can be made of n-type semiconductor.

Although it has been described that the forming of the p-region in the n-type semiconductor plate is carried out by the method of selection diffusion, it can be carried out by any other known methods such as by the method of ion injection.

Since the light receiving element is made of semiconductor, a circuit such as shown in FIG. 4 to be associated with the light receiving element can be formed as an integrated circuit on the same semiconductor plate as that formed with the light receiving element. This results in a compact size for the image position detector of the present invention, and is particularly suitable for use in a device such as a camera.

According to the present invention, when an image to be formed on the plate is sufficiently small when compared with the distance between the electrodes, the current signal produced from each electrode is based on the photocurrent generated by the same image. Therefore, all the signals obtained from the electrodes contain the same information of brightness of the image. Thus, by taking a ratio between the obtained signals, it is possible to obtain a signal which is free from the brightness of the image and is in relation only to the position of the image. Thus, it is not necessary to correct the signal error caused by the brightness change or by the difference between optical axes for the light emission arrangement and light receiving arrangement. Furthermore, it is not necessary to make any mechanical adjustments, such as an adjustment of position of a cylindrical lens used for forming an elongated image.

Although the present invention has been fully described with reference to the preferred embodiment, many modifications and variations thereof will now be apparent to those skilled in the art, and the scope of the present invention is therefore to be limited not by the details of the preferred embodiment described above, but only by the terms of appended claims.

What is claimed is:

1. In an image position detector which includes:

light receiving means on which an image of a light beam is formed, a signal processing circuit for processing the output of said light receiving means to produce a signal indicative of the position of the image on said light receiving means, an improvement wherein said light receiving means comprising:

a semiconductor device comprising:

a semiconductor plate made of either one of an n-type material and a p-type material and having an image receiving surface adapted to receive said image thereon;

a different type region made of the other of said n-type and p-type materials and provided only within certain discrete areas of said semiconductor plate to partially appear in said image receiving surface and to extend from said image receiving surface substantially perpendicularly into said semiconductor plate, any overlaying of said respective n-type material and p-type material occurring only in said certain discrete areas to form a p-n junction under a part of said image receiving surface;

a first electrode provided on said different type region; and a second electrode provided on said semiconductor plate, whereby said different type region and said semiconductor plate produce therebetween a photocurrent which exponentially varies with the position of said image relative to said different type region when the brightness of said image is kept unchanged, said photocurrent being output from said first and second electrode to be processed by said signal processing circuit.

2. An improvement as defined in claim 1, wherein said first electrode is made of an opaque material.

3. An improvement as defined in claim 1, wherein said different type region comprises first and second regions having thereon said first and second electrodes respectively and spaced a predetermined distance from one another such that the image is formed on the area of said image receiving surface between said first and second regions, whereby said first region and said semiconductor plate produce a first photocurrent which exponentially varies with the position of the image relative to said first region when the brightness of the image is kept unchanged, and said second region and said semiconductor plate produce a second photocurrent which exponentially varies with the position of the image relative to said second region when the brightness of the image is unchanged.

4. An improvement as defined in claim 3, wherein said signal processing circuit comprises means for calculating the ratio between the first and second photocurrents.

5. An improvement as defined in claim 4, wherein said ratio calculating means comprises:

a first logarithmic converter for producing a first output proportional to the logarithm of the first photocurrent; and a difference detecting circuit for producing a third output corresponding to the difference between said first and second outputs, whereby said third output is a signal which is indicative of the position of the image relative to said first region or said second region.

6. An improvement as defined in claim 5, wherein said signal processing circuit further comprises means for deriving the components corresponding to the brightness of the image itself from the first and second photocurrents which may include the components corresponding to the intensity of an ambient light incident on said semiconductor plate, so that said first and second outputs are proportional to the logarithm of the components of the first and second photocurrents corresponding to the brightness of the image itself.

7. An improvement as defined in claim 5, wherein said difference detector comprises a differential amplifier.

8. An improvement as defined in claim 1, wherein said signal processing circuit is formed on said semiconductor plate as an integrated circuit.

9. An improvement as defined in claim 3, wherein said first and second regions are of rectangular shape and extend along said semiconductor plate perpendicular to the direction in which the image is to be shifted.

10. An improvement as defined in claim 9, wherein said different type region further comprises third and fourth regions of a rectangular shape extending in parallel to said direction along said semiconductor plate and separated from said first and second regions.

11. An improvement as defined in claim 10, wherein said light receiving means comprises first to fourth opaque electrodes which cover said first to fourth regions respectively.

12. An improvement as defined in claim 3, wherein each of said first and second regions comprises a first rectangular portion extending along said semiconductor plate perpendicular to the direction in which the image is to be shifted and a second rectangular portion integral with said first rectangular portion and extending in parallel to said image direction along said semiconductor plate.

13. A semiconductor detector assembly adapted for use in an image position detecting system comprising:

a semiconductor member having a base member of a first semiconductor material and having an operative planar surface and a discrete reference area made of a second semiconductor material and provided within said base member, to partially appear in said operative surface, said discrete reference material extending from said planar surface substantially perpendicularly into said base member, any overlapping of said respective discrete reference area and said base material occurring only in said discrete reference area to form a junction of said first and second semiconductor materials under a part of said operative surface, said base member and said reference area generating in response to radiation energy incident upon said operative surface, an electrical current which exponentially varies with the incident position of said radiation energy relative to said reference area;

first and second electrodes provided on said reference area and said base member respectively to output said electrical current;

means for positioning the radiation energy representative of an object in a discrete pattern that is less than the entire operative surface of the base member;

means connected to said first and second electrodes for measuring said electrical current; and means for determining the position of the object in response to the measured electrical current.

14. The invention of claim 13, wherein said first electrode is opaque.

15. A semiconductor detector assembly adapted for use in an image position detecting system comprising:

a semiconductor member having a base member of a first semiconductor material and having an operative surface and at least a pair of discrete reference areas made of a second semiconductor material and provided within said base member to partially appear in said operative surface, said discrete reference materials extending from said operative surface substantially perpendicularly into said base member, any overlapping of said respective discrete reference area and said base member occurring only in said discrete reference areas, to form a junction of said first and second semiconductor materials under a part of said operative surface respectively, said base member and said reference areas, in response to radiation energy incident on said operative surface between said reference areas generating electrical currents which exponentially vary with the incident position of said radiation energy relative to said reference areas;

means for positioning the radiation energy representative of an object in a discrete pattern, between the pair of reference areas, that is less than the entire operative surface of the base member;

first electrodes provided on said reference areas;

a second electrode provided on said base member, said first electrodes and said second electrode outputting said electrical currents;

means connected to said first electrodes and second electrode for measuring said electircal currents; and means for determining the position of the object in response to the measured electrical currents.

16. The invention of claim 15 wherein the means for determining the position of the object includes means for providing an output signal which represents a ratio of the measured electrical currents to eliminate variations in radiation intensity of the incident pattern on the operative surface.

17. The invention of claim 13 further including a transparent electrically nonconductive layer deposited on the semiconductor plate with openings in the layer only under the electrode, the electrode positioned over the discrete reference area, being of a sufficiently large size to prevent the reference area from being contacted by the light beam whereby current generation from a direct impinging light beam is prevented.

18. The invention of claim 15 further including a transparent electrically nonconductive layer depositied on the first semiconductor material and having openings in the layer only under the electrodes, the electrodes positioned over the reference areas being of sufficient size to prevent the reference area from being contacted by direct radiation energy, such as light, incident on the detector assembly.

19. The invention of claim 18 further including a substrate for supporitng the light detector assembly having an electrically conductive layer positioned between the substrate and the base member.

20. The invention of claim 19 wherein the electrodes and the electrically conductive layer on the base member are formed of a film layer of tungsten and the reference areas include one of boron, gallium and indium.

21. A semiconductor detector assembly adapted for use in an image position detecting system to measure the position of an image of incident radiation comprising:

a semiconductor member having a base member of a first semiconductor material and having an operative planar surface to receive an image of radiation energy and a discrete reference area made of a second semiconductor material and provided within said base member to partially appear in said operative surface, said discrete reference area extending from said planar surface approximately perpendicularly into said base member, any overlapping of said respective discrete reference area and said base material occurring only in said discrete reference area to form a junction of said first and second semiconductor materials under a part of said operative surface, said base member and said reference area generating in response to radiation energy incident upon said operative surface, an electrical current which exponentially varies with the incident position of said radiation energy relative to said reference area;

first and second electrodes provided on said reference area and said base member respectively to output said electrical current;

means for positioning the radiation energy representative of an object in a discrete pattern that is less than the entire operatively surface of the base member and at a position that is only displaced from the discrete reference area;

means connected to said first and second electrodes for measuring said electrical current; and means for determining the position of the object in response to the measured electrical current.

22. The invention of claim 21, wherein said first electrode is opaque to the radiation energy and is positioned across the discrete reference area.

* * * * *